(12) United States Patent
Bjernetun et al.

(10) Patent No.: US 8,938,352 B2
(45) Date of Patent: Jan. 20, 2015

(54) METHOD AND DEVICE FOR CONTROLLING A CRUISE CONTROL GOVERNOR IN A VEHICLE

(75) Inventors: Johan Bjernetun, Göteborg (SE); Anders Eriksson, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 275 days.

(21) Appl. No.: 13/643,093

(22) PCT Filed: May 3, 2010

(86) PCT No.: PCT/EP2010/002686
§ 371 (c)(1),
(2), (4) Date: Nov. 15, 2012

(87) PCT Pub. No.: WO2011/137913
PCT Pub. Date: Nov. 10, 2011

(65) Prior Publication Data
US 2013/0211695 A1    Aug. 15, 2013

(51) Int. Cl.
G06F 19/00 (2011.01)
F02D 31/00 (2006.01)
B60W 10/06 (2006.01)
B60W 30/14 (2006.01)
B60W 30/188 (2012.01)

(52) U.S. Cl.
CPC ............... *F02D 31/00* (2013.01); *B60W 10/06* (2013.01); *B60W 30/143* (2013.01);
(Continued)

(58) Field of Classification Search
CPC .............. B60K 2031/0091; F02D 11/105; F60T 8/1755
USPC ........................ 701/110, 93, 84, 70
See application file for complete search history.

(56) References Cited

U.S. PATENT DOCUMENTS 4,697,478 A * 10/1987 Mastumoto et al. .......... 477/108
5,445,128 A   8/1995 Letang et al.
(Continued)

FOREIGN PATENT DOCUMENTS

DE    102006001818 A1    7/2007
DE    102008023135 A1    11/2009
WO    2006107267 A1    10/2006

OTHER PUBLICATIONS

Woodward Governor Company: "Speed Droop and Power Generation" Application Note 01302 Jan. 1, 1991, XP002606750 Retrieved from the Internet: URL:http://www.canadiancontrols.com/documents/technical/Speed%20Droop%20and%20Power%20Generation.pdf.
(Continued)

*Primary Examiner* — John Kwon
(74) *Attorney, Agent, or Firm* — WRB-IP LLP (57) ABSTRACT

A method for controlling a cruise control operable to maintain a set speed of a vehicle according to a plurality of goal droop curves is provided. The goal droop curves include: an isochronous droop curve; a top droop curve; and a bottom droop curve. The method includes performing command according to the droop curves; registering that the vehicle soon will enter an uphill slope; estimating in a vehicle position before entering the uphill slope if a downshift in a transmission of the vehicle will occur when traveling the uphill slope during a coming time period (testimation); if the downshift is estimated to occur then performing a fuel saving action during the time period in order to avoid the downshift. The fuel saving action is one of an adaptation of transmission downshifting limits or to during the time period performing command according to a second isochronous curve.

16 Claims, 8 Drawing Sheets

(52) U.S. Cl.
CPC ...... *B60W 30/1882* (2013.01); *B60W 2520/10* (2013.01); *B60W 2530/16* (2013.01); *B60W 2550/402* (2013.01); *B60W 2710/0616* (2013.01); *B60Y 2200/14* (2013.01)
USPC .......................................... 701/110; 701/93

(56) References Cited

U.S. PATENT DOCUMENTS

| | | | |
|---|---|---|---|
| 5,609,546 A | * | 3/1997 | Torii et al. ................ 477/108 |
| 5,868,214 A | | 2/1999 | Workman |
| 6,839,619 B2 | | 1/2005 | Bellinger |
| 8,498,795 B2 | * | 7/2013 | Eriksson et al. .............. 701/93 |

OTHER PUBLICATIONS

International Search Report (Nov. 17, 2010) for corresponding International application No. PCT/EP2010/002686.

International Preliminary Report on Patentabilty Mar. 30, 2012 for corresponding International application No. PCT/EP2010/002686.

* cited by examiner

METHOD AND DEVICE FOR CONTROLLING A CRUISE CONTROL GOVERNOR IN A VEHICLE

BACKGROUND AND SUMMARY

The present invention generally relates to a method and device for cruise control governors and, more particularly to a cruise control governors using droop selection logic.

The present invention also relates to a computer program product and a storage medium for a computer all to be used with a computer for executing said method.

Figure 1A:
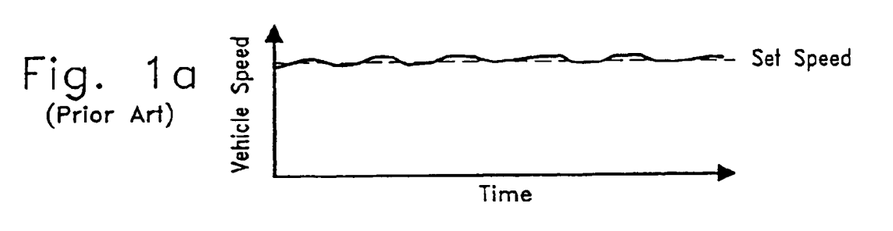
FIG. 1(a) is a plot of vehicle speed as maintained by a cruise control governor plotted as a function of time.
Figure 1B:
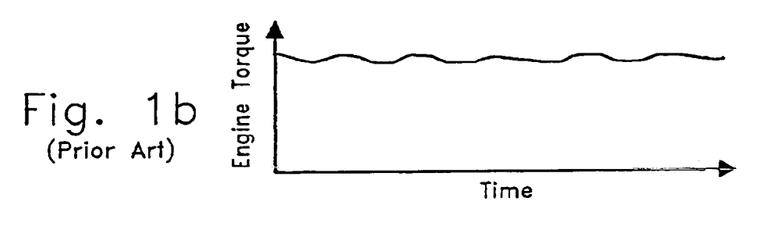
FIG. 1(b) is a plot of engine torque produced by the cruise control governor of FIG. 1(a) plotted as a function of time.

As is known in the art, a cruise control governor attempts to maintain a user-selected vehicle speed. Referring to FIG. 1 (a), if the vehicle speed maintained by the cruise control governor is plotted as a function of time, it is apparent that the actual vehicle speed is not perfectly maintained at the cruise control set speed, because the controller can only attempt to maintain the desired set speed by measuring deviation of the actual speed from the set speed. The governor attempts to maintain a constant vehicle speed by controlling the amount of fuel which is provided, to the engine, which is roughly proportional to the amount of torque that the engine will generate. FIG. 1 (b) plots the engine torque vs. time which corresponds to the vehicle speed plot of FIG. 1 (a). If the vehicle speed is plotted against engine torque, as in FIG. 2, a convenient paradigm is provided for visualizing the action of the cruise control governor. Viewing the cruise control governor from the perspective of FIG. 2 indicates that the engine will produce whatever engine torque is required to maintain a constant vehicle speed. Since the torque that goes into the vehicle varies with the terrain, the torque generation from the engine must also vary in order to maintain a constant vehicle speed.

Figure 3:
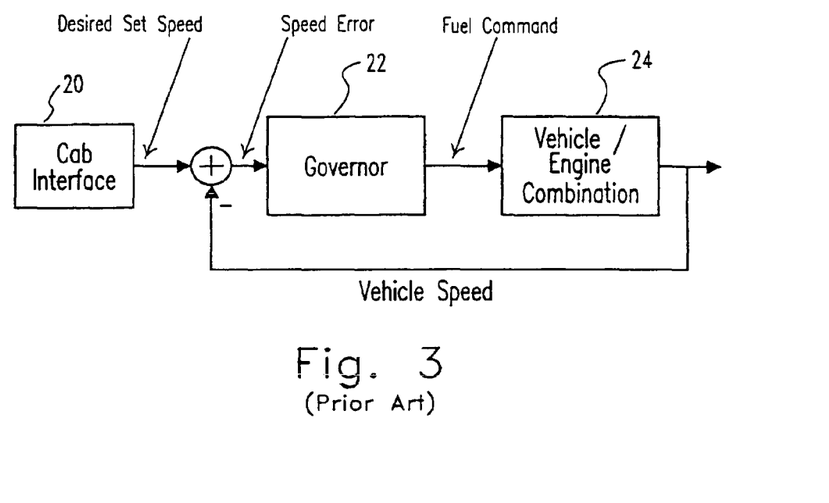
FIG. 3 is a schematic block diagram of a prior art, cruise control governor.
Figure 4A:
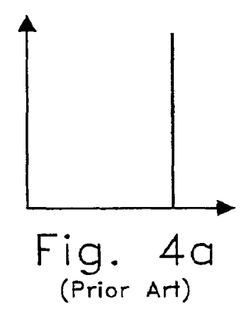
FIG. 4(a)-(f) are examples of prior art cruise control governor droop curves.
Figure 4B:
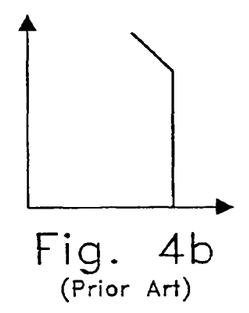
Figure 4C:
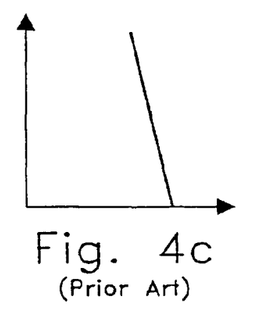
Figure 4D:
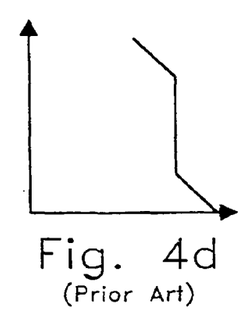
Figure 4E:
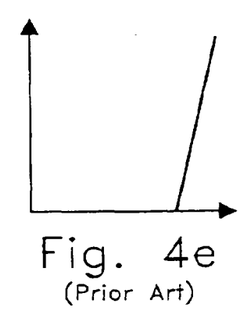
Figure 4F:
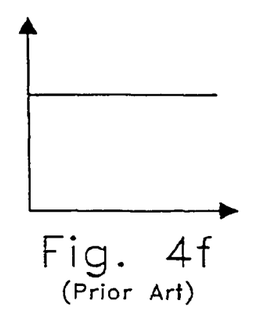

Cruise control governors are devices that attempt to maintain a desired set speed condition by monitoring, the system that they are trying to control. The cruise control governor monitors the road speed of the vehicle and reacts by changing the fuel command to the engine. For example, when the governor detects an underspeed condition, the governor increases the torque generation of the engine in order to increase the speed of the vehicle, thereby compensating for the undesirable underspeed situation. Thus, the governor is not capable of reacting until it recognizes that the vehicle has already deviated from the set speed. Once the vehicle has deviated from the set speed, it is too late for the governor to provide a perfect response, therefore the governor attempts to return the vehicle to the set speed as quickly as possible. Because the vehicle, must deviate from the set speed before the governor reacts, it is impossible for the governor to provide a perfect response. This is why the plot of vehicle speed vs. time in FIG. 1 (a) exhibits slight deviations both above and below the vehicle set speed. FIG. 3 is a process flow diagram which illustrates the interaction of the governor 22 with the vehicle/engine combination 24. The actual measured vehicle speed is subtracted from the desired set speed (which is set by the driver using the cab interface 20) in order to create a speed error signal. This speed error signal is input to the governor 22, which adjusts the fuel command signal to the vehicle/engine combination 24 in response thereto.

Figure 2:
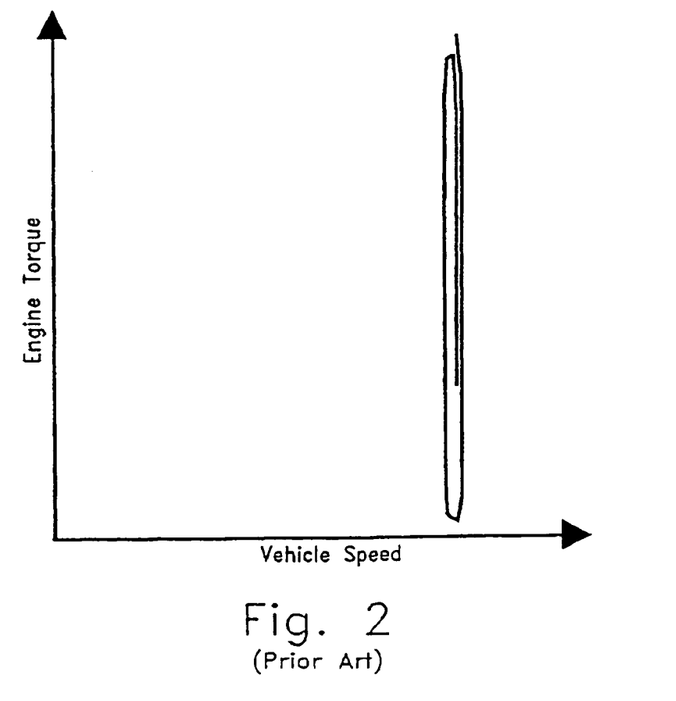
FIG. 2 is a plot of engine torque versus vehicle speed for the data represented by FIGS. 1(a)-(b).

The plot of engine torque vs. vehicle speed in FIG. 2 is referred to as a "droop" curve. Such a droop curve is realized because the controller is attempting to follow a goal droop curve. The controller adjusts its response, and thus the response of the engine, as a function of the current operating conditions of the vehicle and as a function of the goal droop curve. FIGS. 4a-f illustrate examples of various goal droop curves. The shape of the goal droop curve used with any particular controller depends upon the particular response that is desired from the controller.

The ability for the controller to follow the goal droop curves depends upon the gain of the governor. The governor's gain is an indication of the aggressiveness of the controller. A high gain provides a very aggressive governor that will adjust engine torque generation rapidly in an attempt to follow the goal droop curve. However, aggressive gain governors also have a tendency to be unstable. In summary, the goal droop curves define where the controller attempts to maintain vehicle operation, and the governor gains define how aggressively the goal droop curves are followed.

Figure 5:
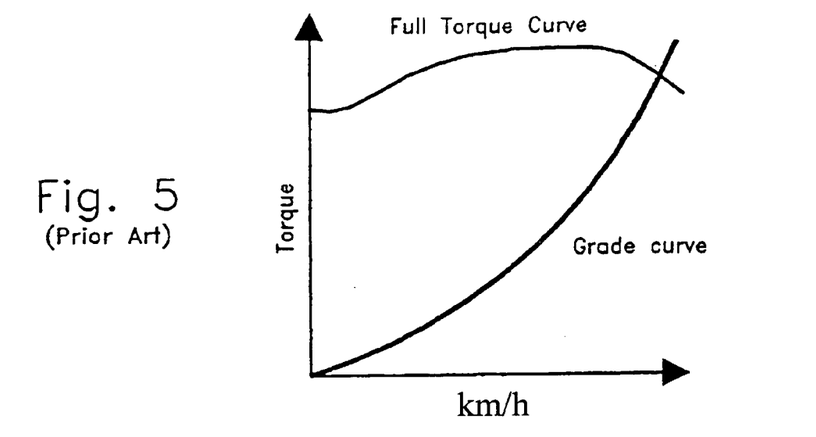
FIG. 5 is a plot of a prior art grade curve.
Figure 6:
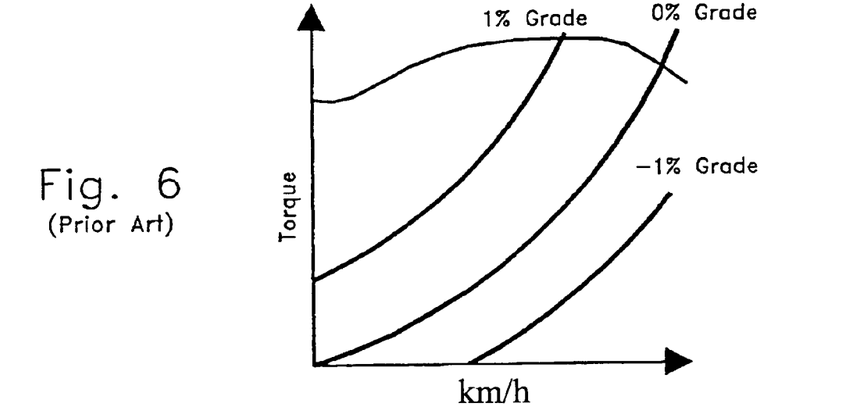
FIG. 6 is a plot of several prior art grade curves exhibiting different percent grades.
Figure 7:
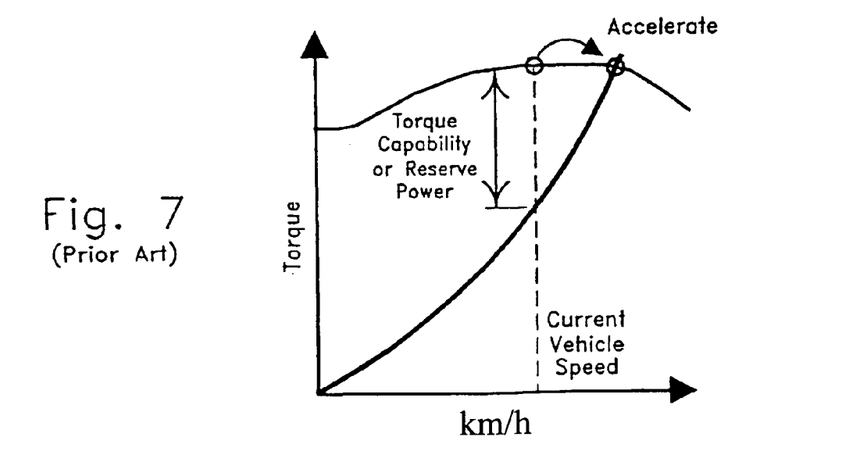
FIG. 7 is a plot of a prior art grade curve.

Because vehicle speed determines where on the goal droop curve the controller attempts to operate, environmental factors which affect the speed of the vehicle affect the performance of the controller. One such environmental factor is the grade of the road surface upon which the vehicle travels. Gradability is a concept that allows one to consider the relationship between vehicle speed, the grade of a hill, the full torque curve of the engine, aerodynamic drag, gearing and torque requirements. This concept utilizes a grade curve as illustrated in FIG. 5. The grade curve denotes the torque needed, at every speed, to remain at an equilibrium for a certain combination of hill grade, aerodynamic drag, and gearing selection. FIG. 6 shows some examples of how various hill grades affect the placement of the grade curve. Such grade curves are useful because they provide an easy means to determine if the vehicle is going to accelerate or decelerate. If at the current vehicle speed, the grade curve is higher than the torque curve, then the vehicle will slow down to the point of intersection between the grade curve and the torque curve. If, at the current vehicle speed, the grade curve is lower than the torque curve, then the vehicle will accelerate to a vehicle speed where the grade curve and the torque curve intersect. FIG. 7 shows an example of such movement.

Figure 8:
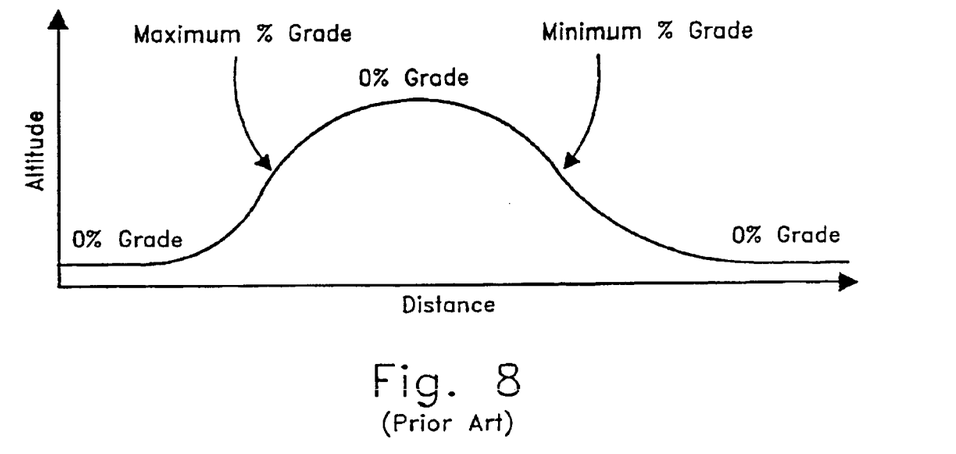
FIG. 8 is a plot of altitude versus distance for a symmetrical hill.
Figure 9:
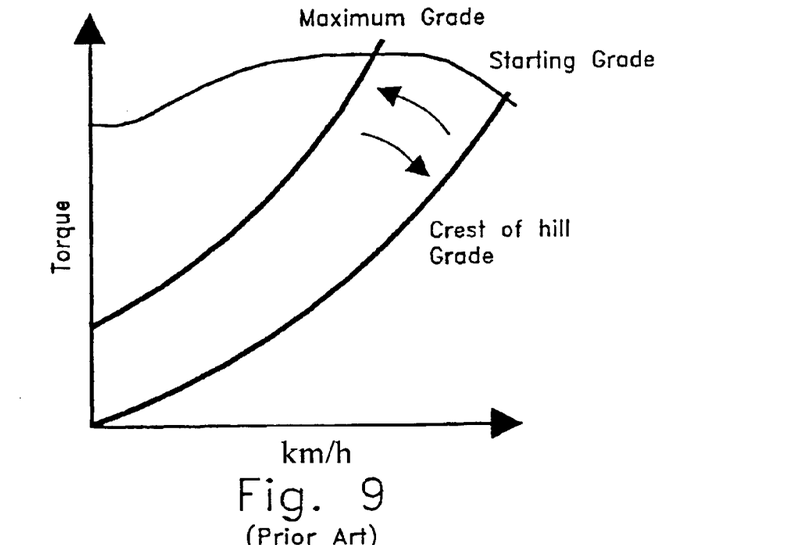
FIG. 9 illustrates the movement of a grade curve as a vehicle crests a hill.

When the vehicle goes over a hill, the grade varies depending upon where on the hill the vehicle is placed. FIG. 8 shows the various grades which are encountered by the vehicle on a symmetrical bill. As illustrated in FIG. 9, the grade curve for a vehicle progressing to the top of a hill will move to the left as the maximum percent grade is reached, and then move back to the right as the grade is decreased back to zero, lithe vehicle slows down at all before the crest of the hill, due to the higher torque requirements, then the vehicle will accelerate before the top of the bill because the grade curve moves to the right as the vehicle approaches the crest of the bill (0% grade). The exact location of the start of the acceleration will depend upon the shape and length of the hill, the rating of the engine, and the aerodynamics of the vehicle.

Because most hills are relatively symmetrical and follow the model of FIG. 8, acceleration of the vehicle as it nears the crest of the hill is undesirable due to the fact that the vehicle will accelerate automatically on the downside of the hill due to the negative grade. Conversely, a vehicle entering a valley will decelerate on the downside of the hill prior to its eventual automatic deceleration when it encounters the upside of the hill on the opposite side of the valley. When a vehicle accelerates prior to a point where the terrain will cause the vehicle to accelerate automatically, or when a vehicle decelerates prior to a point where the terrain will cause the vehicle to decelerate automatically, fuel is wasted.

U.S. Pat. No. 5,868,214 discloses an example of prior art where a cruise controller is able to recognize that the vehicle is cresting a hill or approaching the bottom of a valley, and thereby alter the performance of the cruise control governor in order to obtain maximum fuel economy throughout the entire hill or valley event. The cruise control governor is able to dynamically define and switch between various goal droop curves in order to find the best goal droop curve for use with the current vehicle driving situation. For instance, different goal droop curves will dynamically be defined and selected when the vehicle is lugging up a hill, coasting down a hill, cruising on level ground, preparing to crest a hill, or preparing to transition off of a downhill slope. When said cruise control governor is applied in a vehicle with a stage-geared automatic transmission and since the vehicle speed is allowed to drop (top droop) when climbing a hill and in order to reach maximum engine torque output, said temporary vehicle speed decrease often can result in a downshift. Many downshifts are necessary in order to be able to climb the hill but there are also many downshifts that are unnecessary and which result in decreased fuel efficiency. Further, when approaching an uphill and when the speed of the vehicle is bigger than set speed, torque can still be delivered from the engine to driving wheels due to the bottom droop curve. This gives a higher vehicle speed later at the crest of the hill. The higher vehicle speed at the crest sometimes results in that a downshift can be avoided. But there are also cases where no downshift would have occurred even if the vehicle speed had been lower. This means that fuel was spent unnecessarily when driving with this higher vehicle speed.

The present invention is directed, according to an aspect thereof, toward presenting as cruise control governor that is able to increase fuel efficiency further.

According to a first aspect of the invention, there is provided a method for controlling a cruise control governor operable to maintain a set speed of a vehicle by commanding fueling to an engine of the vehicle according to a plurality of goal droop curves, where said goal droop curves comprise:
- an isochronous droop curve which coincides with the set speed and is bounded by a first point below a full torque curve of the engine and by a second point above a zero torque curve of the engine;
- a top droop curve which is bounded by the first point and by a third point on the full torque curve;
- a bottom droop curve which is bounded by the second point and by a fourth point on the zero torque curve, the method comprising the steps of:
  - performing command according to said droop curves;
  - registering that the vehicle soon will enter an uphill slope;
  - estimating in a vehicle position before entering said uphill slope if a downshift in a transmission of the vehicle will occur when traveling said uphill slope during a coming time period;
- if said downshift is estimated to occur then performing a fuel saving action during said time period in order to avoid said downshift.

In another embodiment of the invention said fuel saving action being to during said time period performing command according to a second isochronous curve instead of performing command according to at least one of or both of said top and bottom droop curves.

In a further embodiment of the invention said second isochronous curve coincides with said set speed and being extended from said second point and up to said full torque curve of the engine, when performing command instead of according to said top droop curve.

In another embodiment of the invention said second isochronous curve coincides with said set speed and being extended from said first point and down to said zero torque curve of the engine when performing command instead of according to said bottom droop curve.

In a further embodiment of the invention said second isochronous curve coincides with said set speed and being extended from said full torque curve of the engine and down to said zero torque curve of the engine when performing command instead, of according to said top and bottom droop curves.

In another embodiment of the invention said fuel saving action being an adaptation of downshifting limits of said transmission in order to avoid downshifting limits to occur at or above said top droop curve.

In a further embodiment of the invention said adaptation is lowering the downshifting limit to a position below said top droop curve during said tune period.

In another embodiment of the invention said top droop curve being a top dynamic droop curve which is dynamically defined during operation of the vehicle and is bounded by a sixth point on the full torque curve to the left of the third point and by a fifth point on the isochronous droop curve between the first and second points.

In a further embodiment of the invention said bottom droop curve being a bottom dynamic droop curve which is dynamically defined during operation of the vehicle and is bounded by a seventh point on the zero torque curve to the right of the fourth point and by an eighth point on the isochronous droop curve between the second and fifth points.

The present invention also relates to a vehicle comprising a cruise control governor and where a control unit is programmed to perform the steps of said method.

DETAILED DESCRIPTION

For the purposes of promoting and understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated method and device, and such further applications of the principles of the invention as illustrated therein being contemplated as would normally occur to one skilled in the art to which the invention relates.

Figure 10:
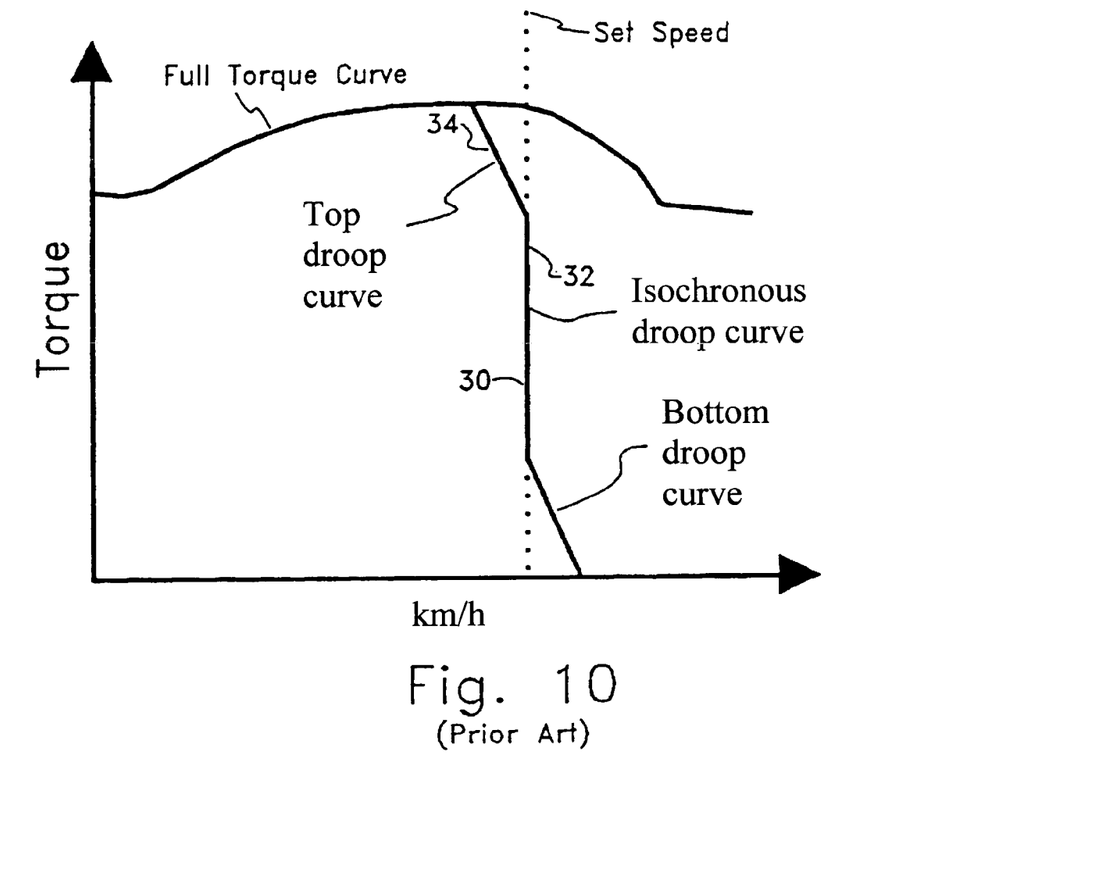
FIG. 10 is a plot of the goal droop curves for as prior art cruise control governor.

FIG. 10 disclose a prior an cruise control governor, which employs three goal droop curves. These goal droop curves are referred to as the top droop curve, the isochronous droop curve and the bottom droop curve. The vehicle cruise control set speed is also indicated in the graph of FIG. 10, this value being set by the driver when cruise control is activated. The cruise control governor attempts to maintain the vehicle's speed at the set speed. However the torque commanded of the engine is determined by trying to maintain vehicle performance on one of the goal droop curves. For example, assume that a vehicle is operating at point 30 on the isochronous droop curve. As the vehicle encounters an uphill slope, the grade of the terrain will cause the vehicle speed to decrease and the cruise control governor will send more fuel to the engine in order to increase the torque output of the engine. Such action by the cruise control governor will move the operating point of the vehicle upwards along the isochronous droop curve to, for example, point 32. At point 32, the vehicle speed is the same as it was at point 30, however more torque is being, produced by the engine in order to counteract the decelerating influence of the positive grade. As the grade of the hill continues to increase, more torque will be required of the engine in order to maintain the set speed. In the simplest cruise control governor, only the isochronous droop curve would be present and the governor would attempt to maintain the set speed by increasing the torque output of the engine until the operating point of the vehicle reached the intersection between the set speed and the full torque curve. At this point, the engine is at maximum torque and further deceleration of the vehicle caused by the positive slope grade will cause the operating point of the vehicle to simply move left along the full torque curve. However, many prior art cruise control governor systems recognize that as the engine operating point moves closer to the full torque curve, the fuel efficiency of the engine severely decreases. Therefore, many such systems do not maintain an isochronous droop curve all the way to the full torque curve, but rather insert a top droop curve which transitions between the isochronous droop and the full torque curve. Therefore, as the slope of the hill further slows the vehicle, the operating, point of the vehicle will be shifted to move along the top droop curve such as to the point 34. The top droop curve allows an increasingly lower vehicle speed to be tolerated by the cruise control governor as the operating point of the engine moves nearer to the full torque curve.

When the vehicle reaches the portion of the hill where the percent grade tends to decrease towards the crest of the hill, the speed of the vehicle will automatically increase. The cruise control governor will then adjust the fueling to the engine in order to maintain the operating point of the vehicle on the top droop curve, however this point will be moving in a downward direction toward the isochronous droop curve. Conversely, operation of the vehicle will transition to the bottom droop curve as the vehicle accelerates past the set speed.

The top droop curve and the bottom droop curve can be statically or dynamically defined (as in U.S. Pat. No. 5,868, 214). The present invention can be implemented with both types of curves. Further the engine provides propulsion torque to driving wheels of the vehicle via an stage geared automatic transmission. Said automatic transmission can be an Automated Mechanical Transmission (AMT). Dual Clutch Transmission (DCT) or Automatic Transmission with planetary gear steps and torque converter according to known art.

In order to solve the above mentioned problems, a control unit of the cruise control governor of the present invention utilizes a procedure where said control unit is programmed to maintain a set speed of a vehicle by commanding fueling to an engine of the vehicle according to a plurality of goal droop curves. As mentioned above said goal droop curves comprise:

an isochronous droop curve which coincides with the set speed and is bounded by a first point below a full torque curve of the engine and by a second point above a zero torque curve of the engine;

a top droop curve which is bounded by the first point and by a third point on the full torque curve;

a bottom droop curve which is hounded by the second point and by a fourth point the zero torque curve.

The inventive procedure comprises the steps of:

performing command according to said droop curves;

registering that the vehicle soon will enter an uphill slope;

estimating in a vehicle position before entering, said uphill slope if a downshift in a transmission of the vehicle will occur when traveling said uphill slope during a coming time period;

if said downshift is estimated to occur then performing a fuel saving action during said time period in order to avoid said downshift.

Said fuel saving, action can be one of several fuel saving actions as explained below. The selection of an appropriate fuel saving action is decided by the prevailing vehicle condition. The control unit can be programmed to recognize certain vehicle conditions and initiate said estimation or the control unit can be programmed to recognize one certain vehicle condition.

A first vehicle condition can be for example when the vehicle in a present position is travelling with a vehicle speed above said vehicle set speed and where the vehicle is approaching an uphill slope. Thus, said estimation will cover a time period of corning vehicle travelling comprising said uphill slope. Note that in said present position torque can still be delivered from the engine to driving wheels due to control according to the bottom droop curve. When said control unit has recognized this vehicle condition at least one fuel saving action is selected. Said fuel saving actions can be one of:

1. performing command according to a second isochronous curve instead of performing command according to at least one of or both of said top and bottom droop curves;

2. adapting downshifting limits of said transmission in order to avoid downshifting limits to occur at or above said top droop curve.

Figure 11A:
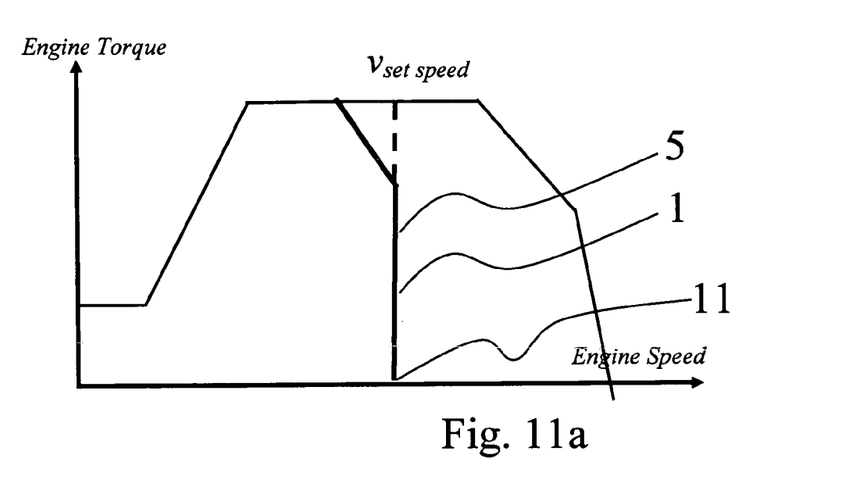
FIG. 11a to 11c disclose goal droop curves used in embodiments according to the invention.
Figure 11B:
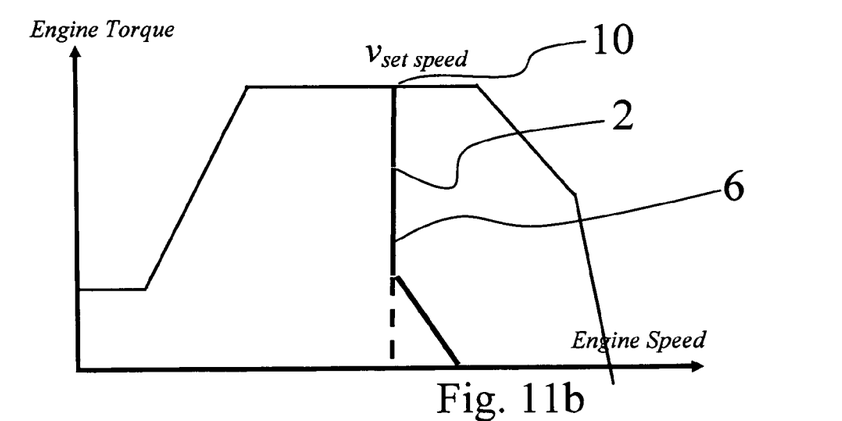
Figure 11C:
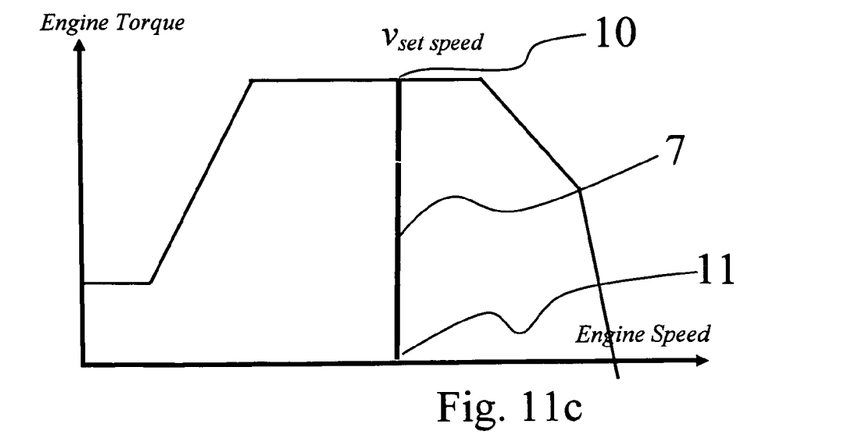

Assume said control unit is programmed to use the first fuel saving action. The control unit will perform an estimation (simulation) in order to find out if command according to said curve in FIG. 10 will initiate a downshift when travelling said corning uphill slope. If estimated that a downshift will be initiated in said transmission then said control unit is programmed to perform a fuel sets saving action during driving said time period and said uphill slope. FIGS. 11a to 11c discloses said first fuel saving action, which comprise to command according to a second isochronous curve (one of the curves in FIGS. 11a-11c) instead of using said curve in FIG. 10.

In FIG. 11a a second isochronous curve 5 coincides with said set speed and is extended from a first point and down to said zero torque curve of the engine when performing command instead of according to said bottom droop curve (see FIG. 10).

In FIG. 11b a second isochronous curve 6 coincides with said set speed and is extended from a second point 2 and up to said full torque curve 10 of the engine, when performing command instead of according to said top droop curve (see FIG. 10).

In FIG. 11c a second isochronous curve 7 coincides with said set speed and is extended from said full torque curve 10 of the engine and down to said zero torque curve 11 of the engine when performing command instead of according to said top and bottom droop curves (see FIG. 10).

Said control unit can in a further embodiment be programmed to estimate if command according to one of said curves in FIGS. 11a to 11c results in an avoidance of downshift. If downshift can be avoided then said control unit can be programmed to command according to one of said curves in FIGS. 11a to 11c instead of said curve in FIG. 10. If not then according to a further embodiment of the invention a further estimation can be performed in order to find out if command according to FIG. 10 or one of FIG. 11 a to 1 c is the most fuel efficient.

Said control unit can in a further embodiment be programmed to estimate which of said curves in FIGS. 11a to 11c is the most fuel efficient during said coming time period. Thus, said second isochronous curve can have different looks and one, two or all of them can be used in the estimation in order to see which can be used in order to avoid, said downshift and which is the most fuel efficient. When one of said curves is found to be the most fuel efficient this curve is selected and said control unit is programmed to command said cruise control governor according to the selected second isochronous curve when driving said uphill slope.

Figure 12:
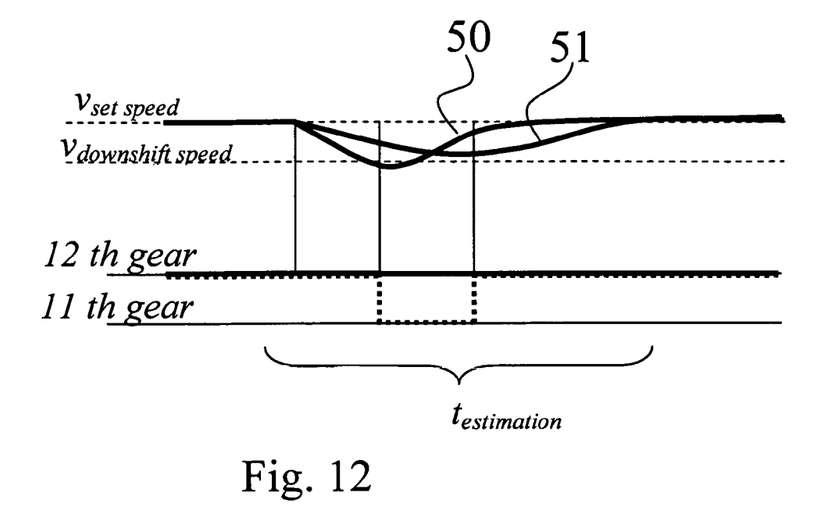
FIG. 12 disclose a vehicle speed diagram and a gear shifting diagram where the effects of the invention can be seen.

FIG. 12 discloses an example of how the vehicle speed varies during said time period testation when the vehicle travels said uphill slope when command is performed according to said curve in FIG. 10 (see speed curve 50) and according to said second isochronous curve (see speed curve 51 which curve in the shown example corresponds to driving according to curve 11b). As can be seen estimated command according to curves in FIG. 10 results in a speed curve 50 where vehicle speed during travelling said uphill slope is estimated to decrease down to (and below) a downshift speed limit (Vdownshift)—Thus, a downshift is estimated to be initiated. According to the invention this can be avoided in at least some cases by performing command according to said second isochronous curve (one of FIGS. 11a to 11 c) which for the same uphill slope results in a speed curve 51 where vehicle speed can be kept above said downshift speed limit (downshift)—Below said speed curves 50 and 51 said downshift is depicted by an example of gear downshift from a gear 12 to a gear 11 (see dotted line). Unbroken line depicts that the same higher gear 12 is engaged during the whole time period testation—The mentioned gears are just examples in order to illustrate the invention. Other gears are also possible.

In a second example of vehicle condition the vehicle can in a present position travel with a vehicle speed above said vehicle set speed and where the vehicle approaching an uphill slope with a crest. Thus, said estimations in above mentioned embodiments will cover a time period that includes said uphill slope and said crest.

Figure 13:
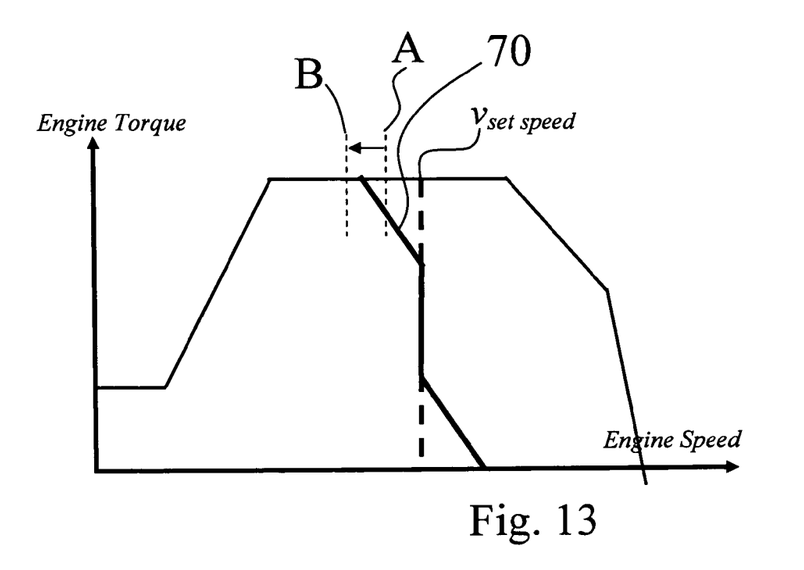
FIG. 13 disclose a further goal droop curve where an adaptation of downshifting according to the invention is depicted.

Assume said control unit is programmed to use said second fuel saving action. FIG. 13 disclose a goal droop curve similar to the one in FIG. 10. According to one embodiment of the invention said control unit is also here programmed to perform the steps of:

performing command according to said droop curves in FIG. 13;
registering that the vehicle soon will enter an uphill slope;
estimating in a vehicle position before entering said uphill slope if a downshift in a transmission of the vehicle will occur when traveling said uphill slope during a coming time period;
if said downshift is estimated to occur then performing a fuel saving action during said time period in order to avoid said downshift.

Said fuel saving action in the last step is the above mentioned adaptation of downshifting limits of said transmission in order to avoid downshifting limits to occur at or above (see FIG. 13) top droop curve 70. According to the invention when said downshift is estimated to occur during travelling of said coming uphill slope, that is, during command according to the top droop curve 70, then said control unit can be programmed to lower the downshifting limit. A to a position below said top droop curve 70 during said time period. This new position of said downshift limit is depicted B in FIG. 13. In this way a downshift can be avoided. In a further embodiment of the invention the control unit also estimates if it is possible to drive the engine at the lower engine speed which corresponds to said new downshifting limit B.

In the above mentioned embodiments said top droop curve can be a top dynamic droop curve which is dynamically defined during operation of the vehicle and is bounded by a sixth point on the full torque curve to the left of the third point and by a fifth point on the isochronous droop curve between the first and second points.

In the above mentioned embodiments said bottom droop curve can be a bottom dynamic droop curve which is dynamically defined during operation of the vehicle and is bounded by seventh point on the zero torque curve to the right of the fourth point and by an eighth point on the isochronous droop curve between the second and fifth points.

Figure 14:
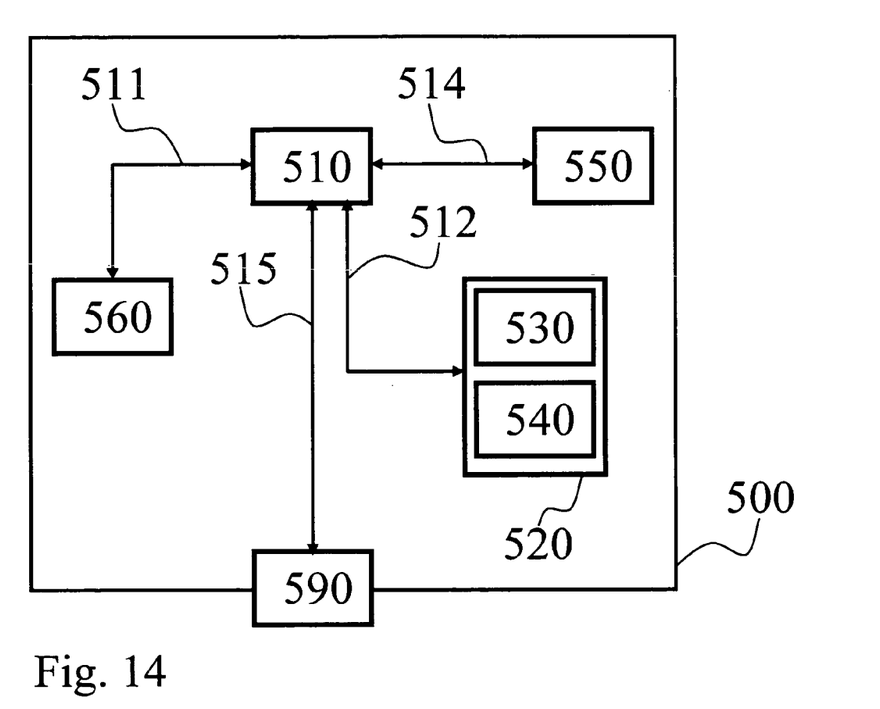
FIG. 14 shows the invention applied on a computer arrangement.

FIG. 14 shows an apparatus 500 according to one embodiment of the invention, comprising a nonvolatile memory 520, a processor 510 and a read and write memory 560. The memory 520 has a first memory part 530, in which a computer program for controlling, the apparatus 500 is stored. The computer program in the memory part 530 for controlling the apparatus 500 can be an operating system.

The apparatus 500 can be enclosed in, for example, a control unit, such as the above mentioned control unit for controlling said cruise control governor. The data-processing unit 510 can comprise, for example, a microcomputer.

The memory 520 also has a second memory part 540, in which a program for controlling the cruise control governor according to the invention is stored. In an alternative embodiment, the program for controlling the cruise control governor is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running, a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for controlling a cruise control governor operable to maintain a set speed of a vehicle by commanding fueling to an engine of the vehicle according to a plurality of goal droop curves, where the goal droop curves comprise:
   an isochronous droop curve which coincides with the set speed and is bounded by a first point below a full torque curve of the engine and by a second point above a zero torque curve of the engine;
   a top droop curve which is bounded by the first point and by a third point on the full torque curve;
   a bottom droop curve which is bounded by the second point and by a fourth point on the zero torque curve, the method comprising the steps of:
   performing command according to the droop curves;
   registering that the vehicle soon will enter an uphill slope;
   estimating in a vehicle position before entering the uphill slope if a downshift in a transmission of the vehicle will occur when travelling the uphill slope during a coming time period (testimation);
   if the downshift is estimated to occur then performing a fuel saving action during the time period in order to avoid the downshift, where the fuel saving action being to during the time period performing command according to a second isochronous curve instead of performing command according to at least one of or both of the top and bottom droop curves.

2. A method as in claim 1, where the second isochronous curve coincides with the set speed and being extended from the second point and up to the full torque curve of the engine, when performing command instead of according to the top droop curve.

3. A method as in the claim 1, where the second isochronous curve coincide with the set speed and being extended from the first point and down to the zero torque curve of the engine when performing command instead of according to the bottom droop curve.

4. A method as in the claim 1, where the second isochronous curve coincides with the set speed and being extended from the full torque curve of the engine and down to the zero torque curve of the engine when performing command instead of according to the top and bottom droop curves.

5. A method for controlling a cruise control governor operable to maintain a set speed of a vehicle by commanding fueling to an engine of the vehicle according to a plurality of goal droop curves, where the goal droop curves comprise;
   an isochronous droop curve which coincides with the set speed and is bounded by a first point below a full torque curve of the engine and by a second point above a zero torque curve of the engine;
   a top droop curve which is hounded by the first point and by a third point on the full torque curve;
   a bottom droop curve which is bounded by the second point and by a fourth point on the zero torque curve, the method comprising the steps of:
   performing command according to the droop curves;
   registering that the vehicle soon will enter an uphill slope;
   estimating in a vehicle position before entering the uphill slope if a downshift in a transmission of the vehicle will occur when travelling the uphill slope during a coming time period (testimation):
   if the downshift is estimated to occur then performing a fuel saving action during the time period in order to avoid the downshift, where the fuel saving action being an adaptation of downshifting limits of the transmission in order to avoid downshifting limits to occur at or above the top droop curve.

6. A method as in claim 5, where the adaptation is lowering the downshifting limit to a position (B) below the top droop curve during the time period.

7. A method as in claim 1, where the top droop curve being a top dynamic droop curve which is dynamically defined during operation of the vehicle and is bounded by a sixth point on the full torque curve to the left of the third point and by a fifth point on the isochronous droop curve between the first and second points.

8. A method as in claim 1, where the bottom droop curve being a bottom dynamic droop curve which is dynamically defined during operation of the vehicle and is bounded by a seventh point on the zero torque curve to the right of the fourth point and by an eighth point on the isochronous droop curve between the second and fifth points.

9. A vehicle comprising a cruise control governor a and a control unit programmed to perform the steps of claim 1.

10. A non-transitory computer program product comprising program code stored on a computer readable medium for performing all steps of claim 1.

11. A non-transitory storage medium for use in a computing environment comprising a computer readable program code to perform the method of claim 1.

12. A method as in claim 5, where the top droop curve is a top dynamic droop curve which is dynamically defined during operation of the vehicle and is bounded by a sixth point the full torque curve to the left of the third point and by a fifth point on the isochronous droop curve between the first and second points.

13. A method as in claim 5, where the bottom droop curve is a bottom dynamic droop curve which is dynamically defined during operation of the vehicle and is bounded by a seventh point on the zero torque curve to the right of the fourth point and by an eighth point on the isochronous droop curve between the second and fifth points.

14. A vehicle comprising a cruise control governor and a control unit programmed to perform the steps of claim 5.

15. A non-transitory computer program product comprising program code stored on a computer readable medium for performing all steps of the claim 5.

16. A non-transitory storage medium comprising a computer readable program code to perform the method of the claim 5.

* * * * *